US012635013B2

(12) United States Patent (10) Patent No.: US 12,635,013 B2

Wakabayashi et al. (45) Date of Patent: *May 19, 2026

(54) TELECOMMUNICATIONS APPARATUS AND METHODS

(71) Applicant: Sony Corporation, Tokyo (JP)

(72) Inventors: Hideji Wakabayashi, Basingstoke (GB); Brian Alexander Martin, Basingstoke (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,157

(22) Filed: Mar. 25, 2024

(65) Prior Publication Data

US 2024/0237097 A1 Jul. 11, 2024

Related U.S. Application Data

(63) Continuation of application No. 17/137,371, filed on Dec. 30, 2020, now Pat. No. 11,950,301, which is a (Continued)

(30) Foreign Application Priority Data

Feb. 28, 2014 (EP) .................................... 14157187

(51) Int. Cl.
H04W 76/14 (2018.01)
H04L 5/00 (2006.01)
(Continued)

(52) U.S. Cl.
CPC ........... H04W 76/14 (2018.02); H04L 5/0039 (2013.01); H04L 5/0064 (2013.01); (Continued)

(58) Field of Classification Search
CPC . H04W 76/14; H04W 72/02; H04W 72/0453; H04W 72/56; H04W 92/18;
(Continued)

(56) References Cited

U.S. PATENT DOCUMENTS 9,173,223 B2 10/2015 Lee et al.
9,295,038 B2 3/2016 Hoymann et al.
(Continued)

FOREIGN PATENT DOCUMENTS

WO WO 2015/113690 A1 8/2015
WO WO 2015/113696 A1 8/2015
(Continued)

OTHER PUBLICATIONS

International Search Report issued May 27, 2015. in PCT/EP2015/051456 filed Jan. 26, 2015.
(Continued)

*Primary Examiner* — Jung H Park
(74) *Attorney, Agent, or Firm* — XSENSUS LLP

(57) ABSTRACT

A method of operating a first terminal device to transmit data to a second terminal device by performing device-to-device communication includes selecting radio resources, on which to transmit the data based on a priority status associated with the data, whereby certain radio resource are reserved for use in association with data classified as high priority. A method of operating the second terminal device to receive data from the first terminal device includes: receiving data from the first terminal device using the selected radio resources; determining if another terminal device is transmitting data on a radio resource which is not selected for transmitting data by the first terminal device and which is reserved for transmitting data classified as having a high priority; and, if so, stopping reception of data from the first terminal device
(Continued)

on the selected radio resources and instead seeking to receive further transmissions from the other terminal device.

19 Claims, 9 Drawing Sheets

Related U.S. Application Data continuation of application No. 15/120,394, filed as application No. PCT/EP2015/051456 on Jan. 26, 2015, now Pat. No. 10,897,786.

(51) Int. Cl.

| | |
|---|---|
| *H04W 72/02* | (2009.01) |
| *H04W 72/0453* | (2023.01) |
| *H04W 72/56* | (2023.01) |
| *H04W 92/18* | (2009.01) |

(52) U.S. Cl.
CPC ........... *H04L 5/0087* (2013.01); *H04W 72/02* (2013.01); *H04W 72/0453* (2013.01); *H04W 72/56* (2023.01); *H04L 5/0007* (2013.01); *H04W 92/18* (2013.01)

(58) Field of Classification Search
CPC ... H04L 5/0039; H04L 5/0064; H04L 5/0087; H04L 5/0007
See application file for complete search history.

(56) References Cited

U.S. PATENT DOCUMENTS

| | | | |
|---|---|---|---|
| 9,872,322 | B2 | 1/2018 | Morita |
| 11,310,783 | B2 * | 4/2022 | Novlan ................. H04W 72/23 |
| 2002/0197999 | A1 | 12/2002 | Wu et al. |
| 2003/0135632 | A1 | 7/2003 | Vrzic et al. |
| 2006/0153201 | A1 | 7/2006 | Hepper et al. |
| 2006/0178167 | A1 | 8/2006 | Tamura et al. |
| 2007/0177628 | A1 | 8/2007 | Choi et al. |
| 2008/0201289 | A1 | 8/2008 | Koponen et al. |
| 2008/0293423 | A1 | 11/2008 | Park et al. |
| 2009/0097444 | A1 | 4/2009 | Lohr et al. |
| 2009/0232143 | A1 | 9/2009 | Junyi et al. |
| 2009/0286562 | A1 | 11/2009 | Gorokhov |
| 2009/0310574 | A1 | 12/2009 | Jeon et al. |
| 2010/0091726 | A1 | 4/2010 | Ishii et al. |
| 2010/0118719 | A1 | 5/2010 | Ishii et al. |
| 2011/0013506 | A1 | 1/2011 | Ishii et al. |
| 2011/0267959 | A1 | 11/2011 | Yi et al. |
| 2012/0039284 | A1 | 2/2012 | Barbieri et al. |
| 2012/0064902 | A1 | 3/2012 | Kronander et al. |
| 2012/0182910 | A1 | 7/2012 | Nakashima et al. |
| 2012/0265818 | A1 | 10/2012 | Van Phan et al. |
| 2012/0300662 | A1 | 11/2012 | Wang et al. |
| 2013/0012221 | A1 | 1/2013 | Zou et al. |
| 2013/0052951 | A1 | 2/2013 | Hwang et al. |
| 2013/0060898 | A1 | 3/2013 | Tanaka et al. |
| 2013/0083753 | A1 | 4/2013 | Lee et al. |
| 2013/0086214 | A1 | 4/2013 | Jung et al. |
| 2013/0114531 | A1 | 5/2013 | Ahn et al. |
| 2013/0170387 | A1 | 7/2013 | Wang et al. |
| 2013/0295978 | A1 | 11/2013 | Ruohonen |
| 2013/0322277 | A1 | 12/2013 | Vanganuru et al. |
| 2013/0322413 | A1 | 12/2013 | Pelletier et al. |
| 2014/0024388 | A1 | 1/2014 | Earnshaw et al. |
| 2014/0044036 | A1 | 2/2014 | Kim et al. |

| | | | |
|---|---|---|---|
| 2014/0064203 | A1 * | 3/2014 | Seo ...................... H04W 72/20 |
| | | | 370/329 |
| 2014/0112194 | A1 | 4/2014 | Novlan et al. |
| 2014/0112233 | A1 | 4/2014 | Bodas et al. |
| 2014/0128116 | A1 | 5/2014 | Lim et al. |
| 2014/0153390 | A1 | 6/2014 | Ishii et al. |
| 2014/0242963 | A1 | 8/2014 | Novlan et al. |
| 2014/0295858 | A1 | 10/2014 | Li et al. |
| 2014/0321423 | A1 | 10/2014 | Kalhan |
| 2014/0342738 | A1 | 11/2014 | Ishii |
| 2014/0362831 | A1 | 12/2014 | Young |
| 2014/0369245 | A1 | 12/2014 | Pecen et al. |
| 2015/0092678 | A1 | 4/2015 | Narasimha et al. |
| 2015/0163790 | A1 | 6/2015 | Lee et al. |
| 2015/0173048 | A1 | 6/2015 | Seo et al. |
| 2015/0189642 | A1 | 7/2015 | Yang et al. |
| 2015/0296490 | A1 | 10/2015 | Yi et al. |
| 2015/0312905 | A1 | 10/2015 | Seo et al. |
| 2015/0333893 | A1 | 11/2015 | Lee et al. |
| 2015/0373766 | A1 | 12/2015 | Morita |
| 2015/0382392 | A1 | 12/2015 | Morita et al. |
| 2016/0007406 | A1 | 1/2016 | Yi et al. |
| 2016/0081039 | A1 | 3/2016 | Lindoff et al. |
| 2016/0143078 | A1 | 5/2016 | Jeong |
| 2016/0194986 | A1 | 7/2016 | Yamazaki et al. |
| 2016/0234874 | A1 | 8/2016 | Jung |
| 2018/0199351 | A1 * | 7/2018 | Ro ......................... H04W 72/56 |
| 2020/0107334 | A1 | 4/2020 | Kalhan |

FOREIGN PATENT DOCUMENTS

| | | |
|---|---|---|
| WO | WO 2015/113719 A1 | 8/2015 |
| WO | WO 2015/113720 A1 | 8/2015 |

OTHER PUBLICATIONS

H. Holma et al, "LTE for UMTS: OFDMA and SC-FDMA Based Radio Access", Wiley, ISBN 978-0-470-99401-6. (2009), (4 pages).

R2-133840, "CSMA/CA based resource selection," Samsung, 3GPP TSG-RAN WG2 #84, Agenda Item 7.5.3.1., (Nov. 11-15, 2013), 4 pages.

R2-133990, "Network control for Public Safety D2D Communications", Orange, Huawei, HiSilicon, Telecom Italia, 3GPP TSG-RAN WG2 #84, Agenda Item 7.5.3.1, (Nov. 11-15, 2013), 5 pages.

R2-134246, "The Synchronizing Central Node for Out of Coverage D2D Communication", General Dynamics Broadband UK, 3GPP TSG-RAN 2 #84, Agenda Item 7.5.3.1, (Nov. 11-15, 2013), 3 pages.

R2-134426, "Medium Access for D2D communication", LG Electronics Inc, 3GPP TSG-RAN WG2 #84, Agenda Item 7.5.3.1, (Nov. 11-15, 2013), 9 pages.

Tdoc R2-134238,"D2D Scheduling Procedure", Ericsson, 3GPP TSG-RAN WG2 #84, Agenda Item 7.5.3.1, (Nov. 11-15, 2013), 7 pages.

R2-134248, "Possible mechanisms for resource selection in connectionless D2D voice communication", General Dynamics Broadband UK, 3GPP TSG-RAN 2 #84, Agenda Item 7.5.3.2, (Nov. 11-15, 2013), 9 pages.

R2-134431, "Simulation results for D2D voice services using connectionless approach", General Dynamics Broadband UK, 3GPP TSG-RAN 2 #84, Agenda Item 7.5.3.1, (Nov. 11-15, 2013), 6 pages.

R. Xiaogang et al, "D2D Resource Allocation under the Control of BS", University of Electronic Science and Technology of China, (2013), 7 pages, https://mentor.ieee.org/802.16/dcn/13/16-13-0123-02-000n-d2d-resource-allocation-under-the-Control-of-bs.docx.

RP-122009, "Study on LTE Device to Device Proximity Services", Qualcomm Incorporated, 3GPP TSG RAN Meeting #58x, Agenda Item 13.2,(2012), 5 pages.

* cited by examiner

LTE DOWNLINK SUB-FRAME

TELECOMMUNICATIONS APPARATUS AND METHODS

CROSS REFERENCE TO RELATED APPLICATIONS

This application is a continuation of U.S. application Ser. No. 17/137,371, filed Dec. 30, 2020 (now U.S. Pat. No. 11,950,301), which is a continuation of U.S. application Ser. No. 15/120,394, filed Aug. 19, 2016 (now U.S. Pat. No. 10,897,786), which is based on PCT filing PCT/EP2015/051456, filed Jan. 26, 2015, which claims priority to EP 14157187.7, filed Feb. 28, 2014, the entire contents of each are incorporated herein by its reference.

BACKGROUND

Field

The present disclosure relates to telecommunications apparatus and methods, and in particular to telecommunications apparatus and methods for use in wireless telecommunications systems in which terminal devices are configured to perform device-to-device communications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations there have been proposed approaches in which terminal devices (communications devices) within a wireless telecommunications system may be configured to communicate directly with one another without communications passing through an infrastructure equipment element, such as a base station. Such communications are commonly referred to as a device-to-device (D2D) communications. It is expected that D2D communications will be introduced in LTE release-12.

Thus, D2D communications allow communications devices that are in sufficiently close proximity to directly communicate with each other, both when within and when outside a network's geographical coverage area and when a network might have failed. This D2D communications ability can allow user data to be more efficiently communicated between communications devices by obviating the need for user data to be relayed by a network entity such as a base station, and also allows communications devices that are in sufficiently close proximity to communicate with one another when one or both devices may not be within the coverage area of a network. The ability for communications devices to operate both inside and outside of coverage areas makes LTE systems that incorporate D2D capabilities well suited to applications such as public safety communications, for example. Public safety communications may benefit from a high degree of robustness whereby devices can continue to communicate with one another in congested networks and when outside a coverage area.

Fourth generation networks have therefore been proposed as a cost effective solution to public safety communications compared to dedicated systems such as TETRA (terrestrial trunked radio) which are currently used throughout the world.

One issue for consideration for D2D communications is how individual devices establish which of the available radio resources (e.g. in terms of times and frequencies of transmissions) are to be used for their communications. In a conventional LTE network a scheduling entity of a base station controls resource allocations in both downlink and uplink. Communications devices receive signalling from the base station to indicated which radio resources are allocated for their use. Because in this conventional situation the resource allocations are controlled centrally, the communications associated with different communications devices can be appropriately coordinated. However, in a D2D scenario there may be no centralised control of which devices are using which radio resources (transmission resources), thereby leading to an increased likelihood of collision and interference, for example due to more than one terminal device selecting the same radio resources for simultaneous transmission. Furthermore, it can be difficult to appropriately prioritise transmissions from different terminal devices operating in a D2D scenario.

Because of these issues there is a need for improved schemes for managing D2D communications, for example in the absence of a central coordinating entity.

US 2013/0012221 [1] provides an overview of some aspects of D2D communications in an LTE wireless telecommunications network and discloses a method in which D2D nodes communicate with each other using the same uplink (UL) radio resource that is being used by some other cellular user equipment(s) (UEs). In other words, the UL cellular resources occupied by cellular UEs are reused by D2D nodes in their short-range communications. Centralized control of D2D communications can be performed by appropriate signalling between a D2D-capable UE and an evolved Node B (eNB), and furthermore devices may inform the eNB of an importance level for their data which the eNB may take into account when controlling access to radio resources.

US 2012/0265818 [2] discloses a scheme which involves performing beacon broadcasting in a device-to-device communication network. The approach includes selecting, by a node capable of entering a device-to-device communication network, a channel for broadcasting wherein the selection is based on the characteristics of the node and the state of the node.

SUMMARY

According to one aspect of the present disclosure, there is provided a method of operating a first terminal device to transmit data to a second terminal device by performing device-to-device communication, wherein the method comprises: selecting radio resources on which to transmit the data to the second terminal device based on a priority status associated with the data; and transmitting the data to the second terminal device using the selected radio resources.

According to another aspect of the present disclosure, there is provided a terminal device configured to transmit data to a second terminal device by performing device-to-device communication, wherein the terminal device comprises a controller unit and a transceiver unit configured to operate together to select radio resources on which to transmit the data to the second terminal device based on a priority status associated with the data; and to transmit the data to the second terminal device using the selected radio resources.

According to another aspect of the present disclosure, there is provided circuitry for a terminal device configured to transmit data to a second terminal device by performing device-to-device communication, wherein the circuitry comprises a controller element and a transceiver element configured to operate together to cause the terminal device to select radio resources on which to transmit the data to the second terminal device based on a priority status associated with the data; and to transmit the data to the second terminal device using the selected radio resources.

According to another aspect of the present disclosure, there is provided a method of operating a second terminal device to receive data from a first terminal device by performing device-to-device communication, wherein the method comprises: receiving data from the first terminal device using radio resources selected by the first terminal device for transmitting the data; determining if another terminal device is transmitting data on a radio resource which is not selected for transmitting data by the first terminal device and which is reserved for transmitting data classified as having a high priority; and, if so, stopping reception of data from the first terminal device on the selected radio resources and instead seeking to receive further transmissions from the other terminal device.

According to another aspect of the present disclosure, there is provided a terminal device configured to receive data from a transmitting terminal device by performing device-to-device communication, wherein the terminal device comprises a controller unit and a transceiver unit configured to operate together to: receive data from the transmitting terminal device using radio resources selected by the first terminal device for transmitting the data; determine if another terminal device is transmitting data on a radio resource which is not selected for transmitting data by the transmitting terminal device and which is reserved for transmitting data classified as having a high priority; and, if so, to stop reception of data from the transmitting terminal device on the selected radio resources and instead seek to receive further transmissions from the other terminal device.

According to another aspect of the present disclosure, there is provided circuitry for a terminal device configured to receive data from a transmitting terminal device by performing device-to-device communication, wherein the circuitry comprises a controller element and a transceiver element configured to operate together to cause the terminal device to: receive data from the transmitting terminal device using radio resources selected by the first terminal device for transmitting the data; determine if another terminal device is transmitting data on a radio resource which is not selected for transmitting data by the transmitting terminal device and which is reserved for transmitting data classified as having a high priority; and, if so, to stop reception of data from the transmitting terminal device on the selected radio resources and instead seek to receive further transmissions from the other terminal device.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
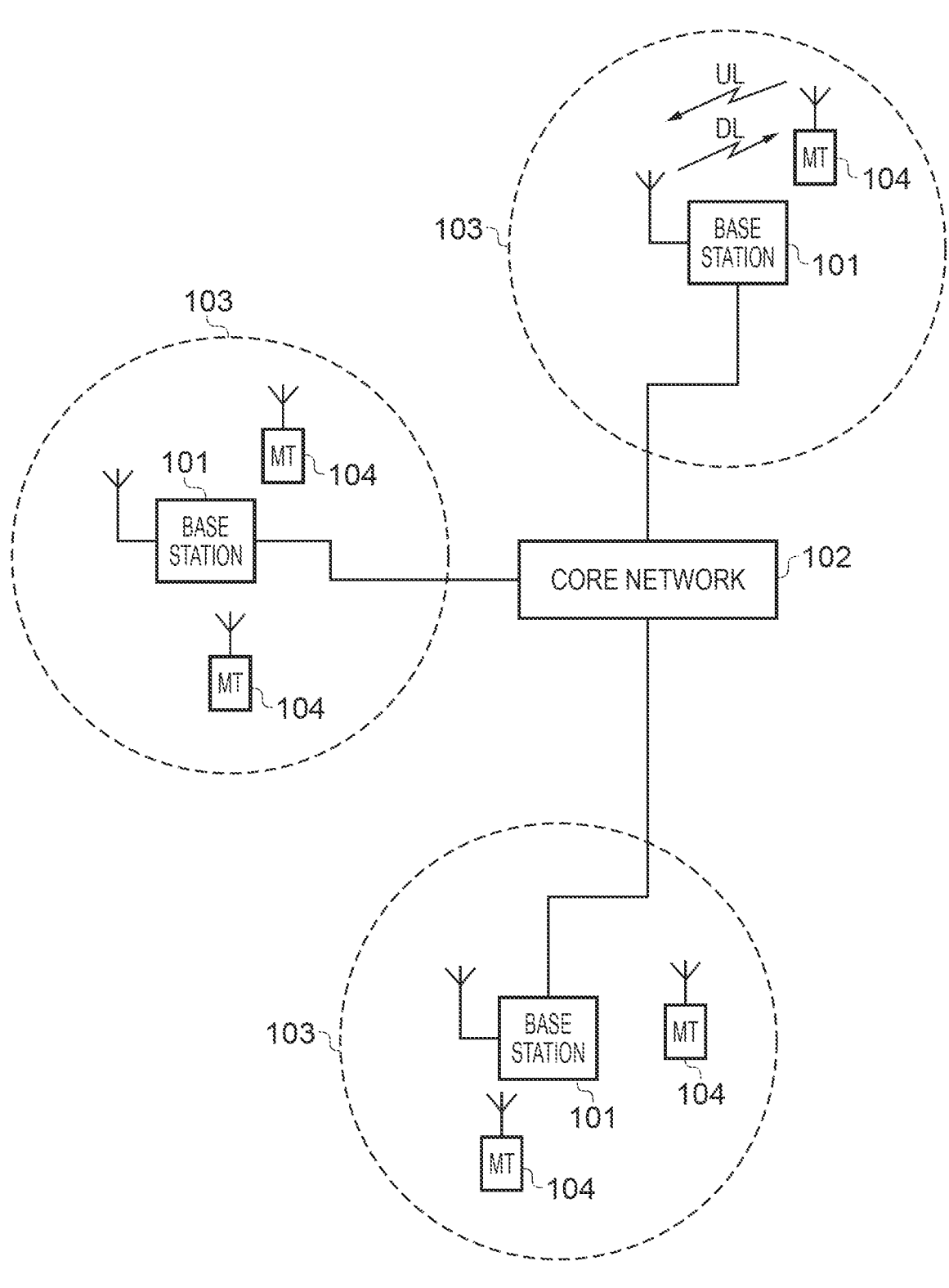
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body and also described in many books on the subject, for example, Holma H. and Toskala A [3]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
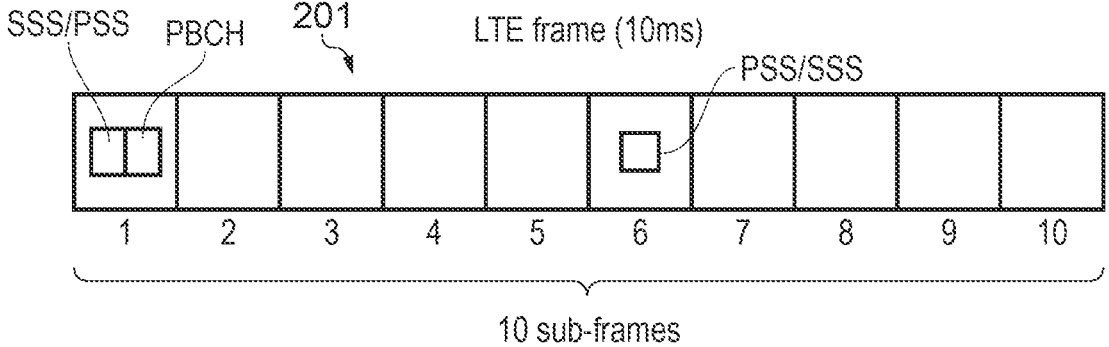
FIG. 2 provides a schematic diagram illustrating a LTE downlink radio frame.

FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
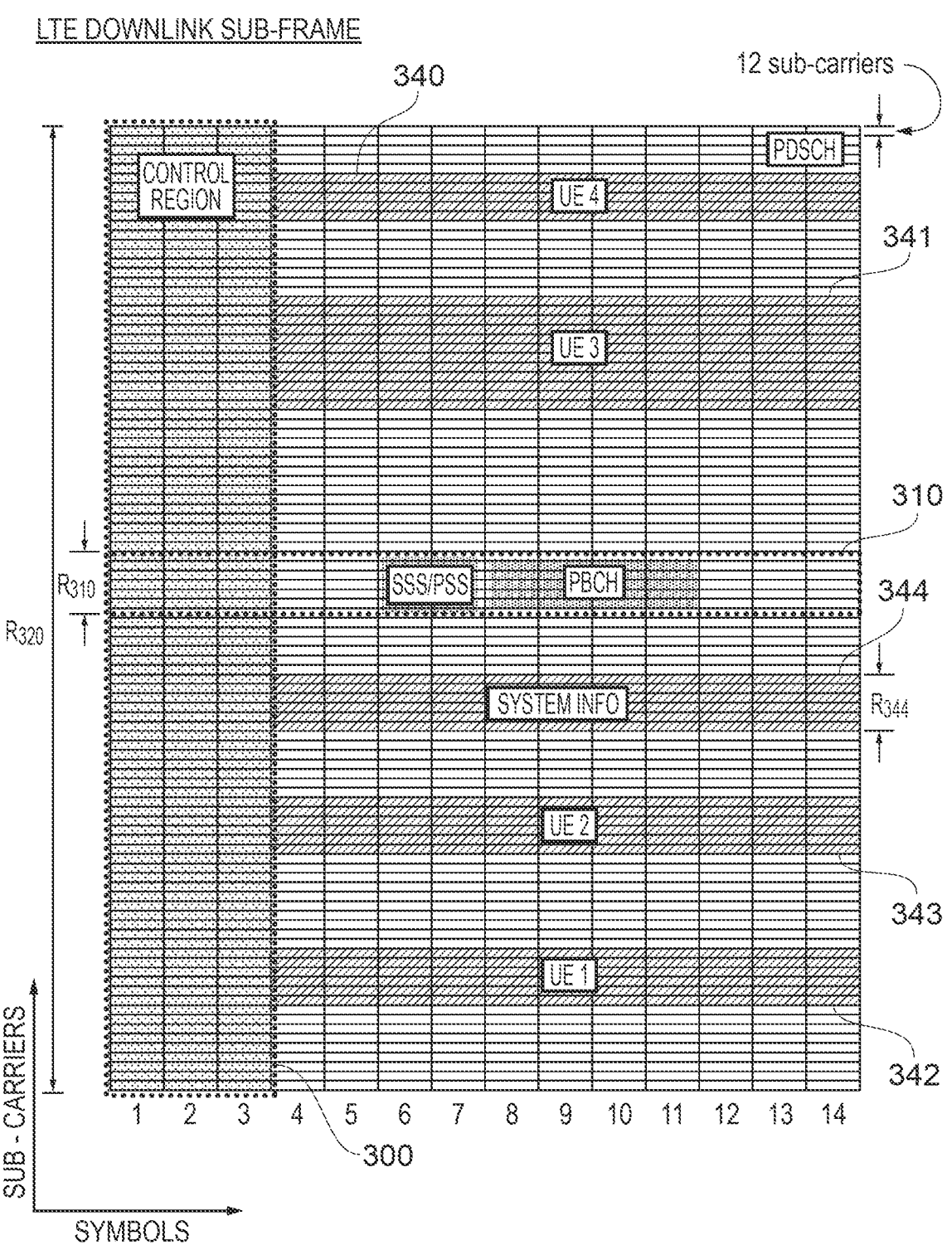
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated by a base station to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are discussed further below but not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

Figure 4:
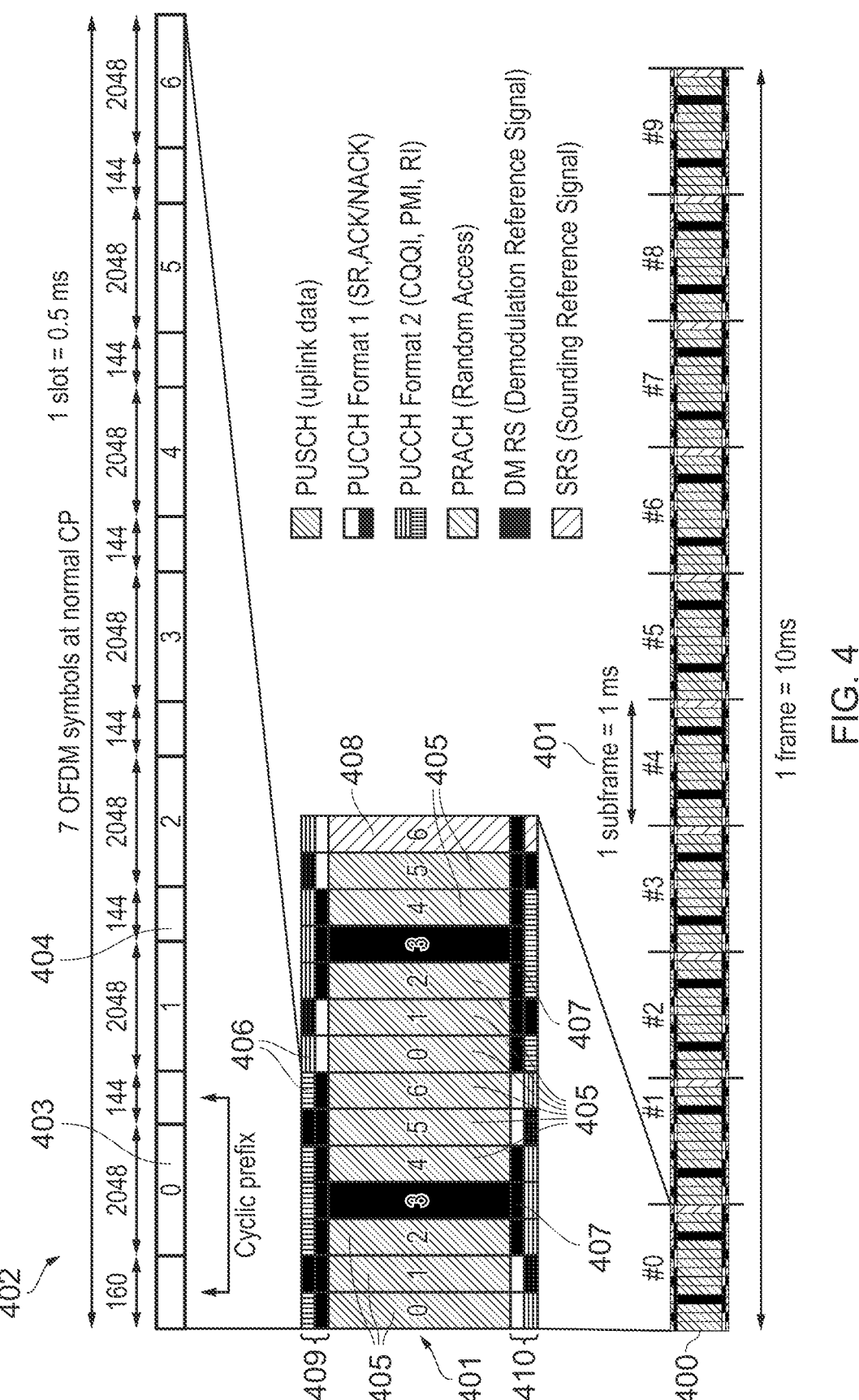
FIG. 4 provides a schematic diagram illustrating an example of a LTE uplink radio subframe.

FIG. 4 is a schematic diagram which illustrates some aspects of the structure of an example conventional uplink LTE subframe. In LTE networks the uplink wireless access interface is based upon a single carrier frequency division multiple access (SC-FDMA) interface and downlink and uplink wireless access interfaces may be provided by frequency division duplexing (FDD) or time division duplexing (TDD), where in TDD implementations subframes switch between uplink and downlink subframes in accordance with predefined patterns an in FDD implementations the uplink and downlink channels are separated by frequency. Regardless of the form of duplexing used, a common uplink frame structure is utilised. The simplified representation of FIG. 4 illustrates such an uplink frame at different levels of resolution with a frame of the uplink frame structure represented at the bottom of the figure, a subframe represented in the middle of the figure, and a slot represented at the top of the figure. Thus the frame 400 is divided in to 10 subframes 401 of 1 ms duration where each subframe 401 comprises two slots 402 of 0.5 ms duration. Each slot is then formed from seven OFDM symbols 403 (numbered 0 to 6 in FIG. 4) where a cyclic prefix 404 is inserted between each symbol. In FIG. 4 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a broadly similar manner to downlink subframes.

As is well known, each uplink subframe may include a plurality of different channels, for example a physical uplink shared channel (PUSCH) 405, a physical uplink control channel (PUCCH) 406, which may take various formats, and a physical random access channel (PRACH). The physical Uplink Control Channel (PUCCH) may carry control information such as ACK/NACK to the base station for downlink transmissions, scheduling request indicators (SRI) for terminal devices wishing to be scheduled uplink resources, and feedback of downlink channel state information (CSI) for example. The PUSCH may carry terminal device uplink data or some uplink control data. Resources of the PUSCH are granted via PDCCH, such a grant being typically triggered by communicating to the network the amount of data ready to be transmitted in a buffer at the terminal device. The PRACH may be scheduled in any of the resources of an uplink frame in accordance with one of a plurality of PRACH patterns that may be signalled to terminal device in downlink signalling such as system information blocks. As well as physical uplink channels, uplink subframes may also include reference signals. For example, demodulation reference signals (DMRS) 407 and sounding reference signals (SRS) 408 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in reference [3].

In an analogous manner to the resources of the PDSCH for downlink communications, resources of the PUSCH for uplink communications are scheduled or granted by the serving base station. Thus for data is to be transmitted by a terminal device, resources of the PUSCH are granted to the terminal device by the base station. At a terminal device, PUSCH resource allocation is achieved by the transmission of a scheduling request or a buffer status report to its serving base station. The scheduling request may be made, when there is insufficient uplink resource for the terminal device to send a buffer status report, via the transmission of Uplink Control Information (UCI) on the PUCCH when there is no existing PUSCH allocation for the terminal device, or by transmission directly on the PUSCH when there is an existing PUSCH allocation for the terminal device. In response to a scheduling request, the base station is configured to allocate a portion of the PUSCH resource to the requesting terminal device sufficient for transferring a buffer status report and then inform the terminal device of the buffer status report resource allocation via a DCI in the PDCCH.

Although similar in overall structure to downlink subframes, uplink subframes have a different control structure to downlink subframes, in particular an upper region 409 and a lower region 410 of subcarriers/frequencies/resource blocks of an uplink subframe are reserved for control signaling (as opposed to the initial symbols for a downlink subframe). Furthermore, although the resource allocation procedure for the downlink and uplink are similar, the actual structure of the resources that may be allocated may vary due to the different characteristics of the OFDM and SC-FDMA interfaces used in the downlink and uplink respectively. For example, for OFDM each subcarrier may be individually modulated and therefore it is not particularly significant whether frequency/subcarrier allocations are contiguous. However, for SC-FDMA the subcarriers are modulated in combination and therefore it can be more efficient to allocate contiguous frequency allocations for each terminal device.

As a result of the above described wireless interface structure and operation, one or more terminal devices may communicate data to one another via a coordinating base station, thus forming a conventional cellular telecommunications system. Although cellular communications system such as those based on the previously released LTE standards have been commercially successful, there are some drawbacks of such centralised systems (centralised in the sense of relying on a coordinating base station to route communications from one terminal device to another). For example, if two terminal devices which are in close proximity wish to communicate with each other, uplink and downlink resources sufficient to convey the data are required. Consequently, two portions of the system's resources are being used to convey a single portion of data. A second drawback is that a base station is required to support terminal devices that wish to communicate, even when the terminal devices are sufficiently close that one could receive signals from the other with sufficient power to be able to reliably decode the signals. This drawback can be particularly significant, for example, when a telecommunications system is experiencing high load or base station coverage is not available, for instance where terminal devices are out of coverage or when a base station is not functioning correctly. To seek to address some of these issues there has been, as noted above, proposals for supporting device-to-device (D2D) communications.

D2D communications offer the possibility to help address some aspects of the aforementioned problems of network capacity and the requirement of network coverage for communications between LTE devices that can arise in some situations. For example, if user data can be communicated directly between terminal devices only one set of resources is required to communicate the data rather than both uplink and downlink resources. Furthermore, if terminal devices are capable of communicating directly, terminal devices within range of each other may communicate even when outside of a coverage area provided a base station.

Figure 5:
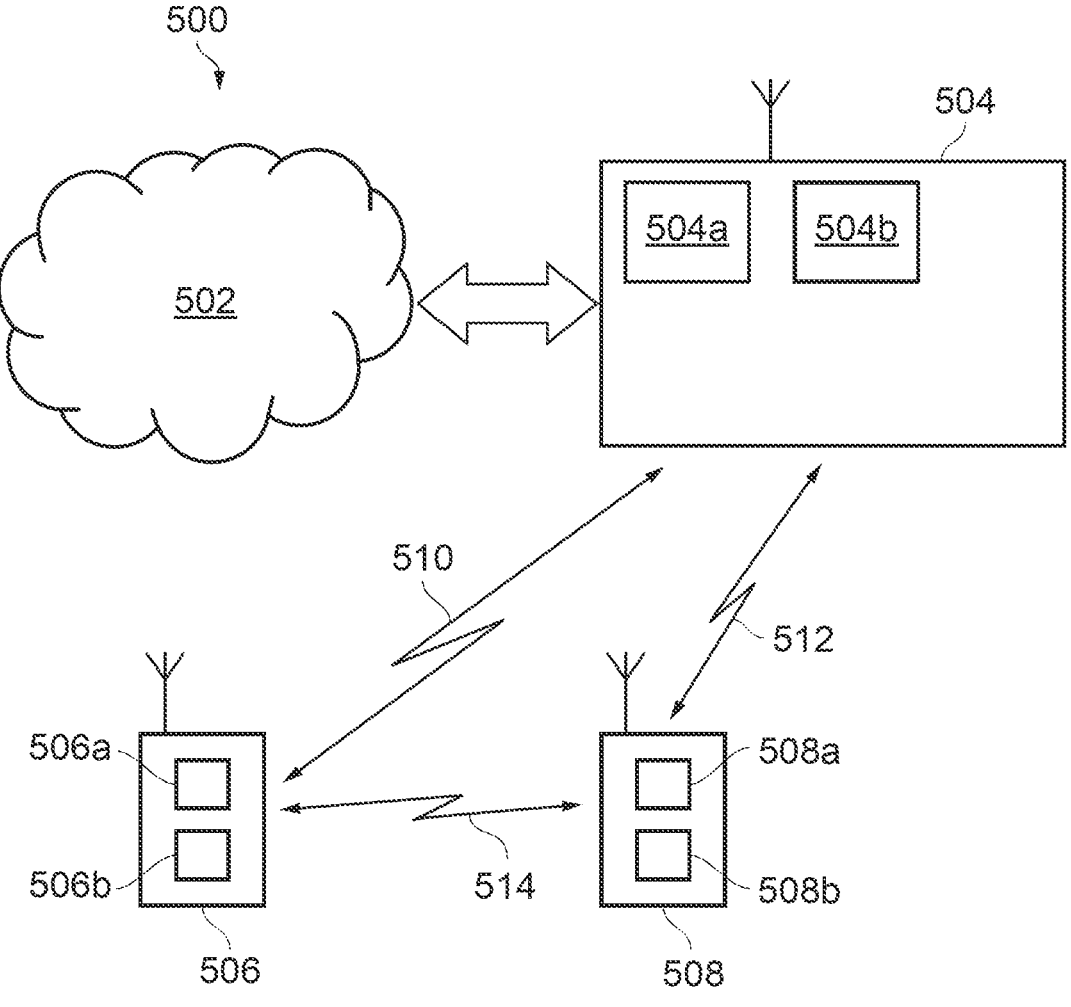
FIG. 5 schematically represents a wireless telecommunications system according to an embodiment of the disclosure.

FIG. 5 schematically shows a telecommunications system 500 according to an embodiment of the disclosure. The telecommunications system 500 in this example is based broadly on a LTE-type architecture with modifications to support device-to-device communications (i.e. direct signalling exchange between terminal devices without data being routed through a base station) generally in accordance with previously proposed schemes for D2D communications. As such many aspects of the operation of the telecommunications system 500 are already known and understood and not described here in detail in the interest of brevity. Operational aspects of the telecommunications system 500 which are not specifically described herein may be implemented in accordance with any known techniques, for example according to the established LTE-standards and known variations and modifications thereof (e.g. to provide support for D2D communications).

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the disclosure as discussed herein.

The first and second terminal devices 506, 508 are D2D enabled devices configured to operate in accordance with embodiments of the present disclosure as described herein. The terminal devices 506, 508 each comprise a transceiver unit 506a, 508a for transmission and reception of wireless signals and a controller unit 506b, 508b configured to control the respective terminal devices 506, 508. The respective controller units 506b, 508b may each comprise a processor unit which is suitably configured/programmed to provide the desired functionality using conventional programming/configuration techniques for equipment in wireless telecommunications systems. The respective transceiver units 506a, 508a and controller units 506b, 508b are schematically shown in FIG. 5 as separate elements. However, it will be appreciated for each of the terminal devices the functionality of the terminal devices receiver and controller units can be provided in various different ways, for example using a single suitably programmed general purpose computer, or suitably configured application-specific integrated circuit(s)/circuitry. It will be appreciated the first and second terminal devices 506, 508 will in general comprise various other elements associated with their operating functionality in accordance with established wireless telecommunications techniques (e.g. a power source, possibly a user interface, and so forth).

The base station 504 comprises a transceiver unit 504a for transmission and reception of wireless signals and a controller unit 504b configured to control the base station 504. The controller unit 504b may comprise a processor unit which is suitably configured/programmed to provide the desired functionality using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the first terminal device 506 over a first radio communication link 510 and communicate data with the second terminal device 508 over a second radio communication link 512. Both radio links may be supported within a single radio frame structure associated with the base station 504. It is assumed here the base station 504 is configured to communicate with the terminal devices 506, 508 over the respective radio communication links 510, 512 in accordance with the established principles of LTE-based communications. That is to say, in accordance with some example implementations, the device-to-device communications between the first and second terminal devices may have no impact on the manner in which the base station operates in its communications with the terminal devices.

However, in addition to the terminal devices 506, 508 being arranged to communicate data to and from the base station (transceiver station) 504 over the respective first and second radio communication links 510, 512, the terminal devices are further arranged to communicate with one another (and other terminal devices within the wireless telecommunications system) in a device-to-device (D2D) manner over a D2D radio communication link 514, as schematically indicated in the figure. The underlying principles of the D2D communications supported in the wireless telecommunications system of FIG. 5 may follow any previously proposed techniques, but with modifications to support approaches in accordance with embodiments of the disclosure as described herein.

There are a number of possible approaches to the implementation of D2D communications within an LTE-based wireless telecommunications system that have been proposed.

Some approaches may rely on a coordinating entity to allocate transmission resources for use by respective terminal devices. For example, the wireless access interface provided for communications between terminal devices and base station may be used for D2D communications, where a base station allocates the required resources for D2D communications with control signalling being communicated via the base station but user data being transmitted directly between terminal devices.

Some approaches may not rely on any coordinating entity for managing access to radio resources by terminal devices undertaking D2D communications. For example it has been proposed in document R2-133840 [4] to use a Carrier Sense Multiple Access, CSMA, to provide a degree of co-ordination for D2D transmissions by terminal devices through contention based scheduling by each terminal device. In effect each terminal device first listens to identify which resources are currently being used, and then schedules its own transmissions on unused resources.

Other previously proposed arrangements include those in which a terminal device acts as a controlling entity for a group of terminal devices to co-ordinate transmissions of the other members of the group. Examples of such proposals are provided in the following disclosures:

[5] R2-133990, Network control for Public Safety D2D Communications; Orange, Huawei, HiSilicon, Telecom Italia

[6] R2-134246, The Synchronizing Central Node for Out of Coverage D2D Communication; General Dynamics Broadband UK

[7] R2-134426, Medium Access for D2D communication; LG Electronics Inc

In another arrangement one of the terminal devices of a group first sends a scheduling assignment, and then transmits data without a central scheduling terminal device or controlling entity controlling the transmissions. The following disclosures provide examples of this de-centralised arrangement:

[8] R2-134238, D2D Scheduling Procedure; Ericsson;

[9] R2-134248, Possible mechanisms for resource selection in connectionless D2D voice communication; General Dynamics Broadband UK;

[10] R2-134431, Simulation results for D2D voice services using connectionless approach General Dynamics Broadband UK In particular, the last two disclosures listed above, R2-134248 [9], R2-134431 [10], disclose the use of a scheduling channel, used by terminal devices to indicate their intention to schedule data along with the resources that will be used. The other disclosure, R2-134238 [8], does not use a scheduling channel as such, but deploys at least some predefined resources to send the scheduling assignments.

Other example arrangements disclosed in [11] and [12] require a base station to provide feedback to the communications devices to control their transmissions. Document [13] discloses an arrangement in which a dedicated resource exchanging channel is provided between cellular user equipment and device-to-device user equipment for interference control and resource coordination.

It is to be expected that device-to-device communications will be supported on a radio interface spanning a plurality of frequencies and having a radio frame structure comprising a plurality of subframes. For example, physical layer signalling associated with device-to-device communications may be implemented using a transmission resource grid having similarities to known transmission resource grids, for example the uplink and downlink LTE transmission resource grids schematically represented in FIGS. 3 and 4. For example, it may be expected that device-to-device communications when implemented in the context of an existing LTE-based wireless telecommunications network will re-use transmission resources within the LTE uplink frame structure. There are various reasons for this. For example, traffic profiles in wireless telecommunications systems are typically such an uplink channel is more likely to have more spare capacity then a downlink channel. Furthermore, the downlink channel is associated with more powerful transmissions from a base station and these are more likely to swamp and interfere with device-to-device communications.

Thus, for the example represented in FIG. 5 it is assumed the radio communications link 514 that is supporting device-to-device communications between the first terminal device 506 and the second terminal device 508 is based around a transmission resource grid comprising a plurality of frequency carriers and a radio frame structure comprising a plurality of subframes. Physical layer signalling between the first terminal device and the second terminal device may be made using transmission resources within this resource grid. However, the exact nature of the transmission resource grid supporting the D2D communications is not significant to the principles underlying the operation of various embodiments of the disclosure.

One issue which can arise in connection with device-to-device communications, and especially in implementations which do not rely on any central coordinating entity for managing access to radio resources, is a need to allow communications between terminal devices to be prioritised.

For example, in a "walkie-talkie" implementation a first terminal device may transmit data to a second terminal device (and possibly other terminal devices in a broadcast type arrangement) for a relatively extended period of time (e.g. on the order of seconds or longer) as a user of the first terminal device continues to talk. In implementations where there is no central coordination of access to radio resources, the first terminal device may in effect select radio resources to use (e.g. in terms of times and frequencies) and announce its intention to communicate with the other terminal device(s) using the selected radio resources, and then proceed to do so. The transmitting terminal device may continue doing this by continuing to select radio resources and announce its intention to use these for so long as necessary to transmit the relevant data. A general example of this approach is described in R2-134238 [8].

The announcement of the selected radio resources (which may be referred to as a scheduling assignment message) can be considered in some respects to mirror some of the functions of resource allocation signalling conventionally sent from a base station to terminal devices in a non D2D scenario. However, one potentially significant difference is that conventional resource allocations in LTE are generally made by a base station on a per subframe basis. That is to say, resource allocation signalling in one subframe will typically apply to resource allocations in one subframe (i.e. the same subframe in downlink or a subsequent subframe in uplink). However, it may be expected for D2D communications that scheduling announcement signalling may apply for a number of subframes, for example to reduce overall control signalling requirements.

Scheduling assignment signalling can serve a number of functions. For example it can serves to indicate an intended recipient (or recipients) for a data transmission and also inform them of the radio resources they should receive and decode to receive the data. A scheduling assignment message can also serve to inform other nearby terminal devices planning to make transmissions about which resources they should preferably avoid to reduce the risk of interference.

The inventors have recognized a drawback of this approach is the first terminal device can in effect autonomously block the use of certain radio resources for an extended period, and this may be problematic if there are other terminal devices needing to make use of the blocked resources to transmit higher priority data. In accordance with currently proposed techniques a terminal device wishing to make high priority transmissions on resources that have already been claimed for use by a first terminal device will simply have to wait until the first terminal device has completed its transmissions. With this in mind, the inventors have recognised a need for approaches in a D2D scenario which can allow one terminal device to in effect interrupt transmissions by other terminal devices, for example because it has urgent (high priority) data to transmit. More generally, the inventors have also recognised a need for approaches in a D2D communications scenario that allow for the prioritisation of data transmissions by terminal devices, for example whereby a terminal device wishing to transmit data associated with a relatively high priority is provided with greater access to the available radio resources to transmit the data than a terminal device wishing to transmit data associated with a relatively low priority.

Thus, in accordance with certain embodiments of the disclosure there is introduced the concept of radio resources for device-to-device communications which are reserved for use for communicating data associated with a certain level of priority. For example, a wireless interface for a device-to-device communications link may be supported by a radio frame structure comprising a plurality of subframes, and radio resources corresponding to certain subframes may be reserved for communicating data classified as high priority, whereas other subframes may be used for communicating data not classified as high priority (as well as data classified as high priority).

Figures 6A, 6B:
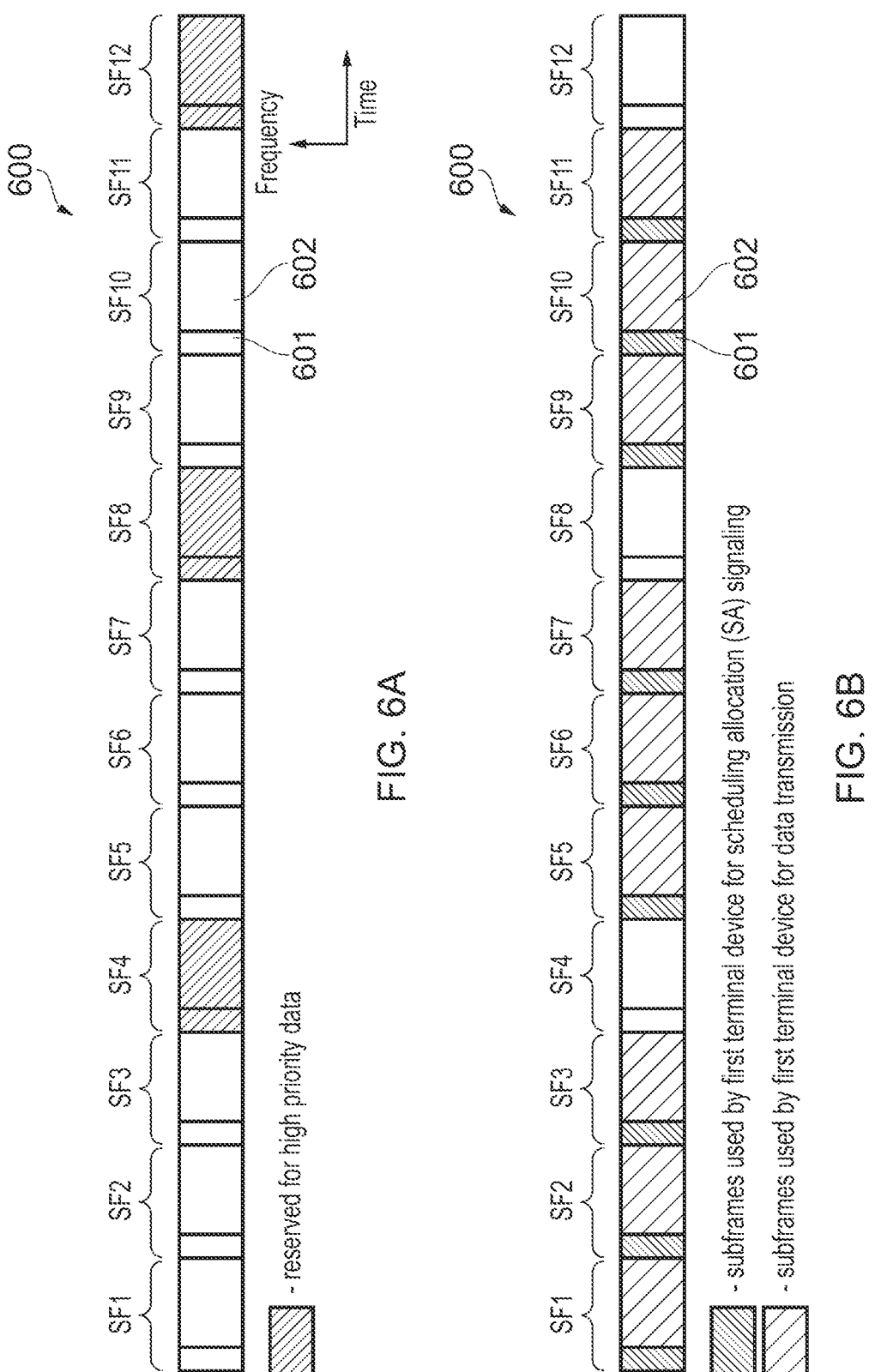
FIG. 6A schematically shows a radio frame structure for supporting device-to-device communications between terminal devices in accordance with certain embodiments of the disclosure.
FIG. 6B schematically shows radio resources of the radio frame structure of FIG. 6A selected by a first terminal device for use in making device-to-device transmissions to a second terminal device in accordance with certain embodiments of the disclosure.

FIG. 6A schematically shows a radio frame structure 600 for supporting device-to-device communications between the first terminal device 506 and the second terminal device 508 across the radio communications link 514 schematically represented in FIG. 5 in accordance with an embodiment of the present disclosure. An example mode of operation will be described in which it is assumed the first terminal device 506 wishes to transmit data to the second terminal device 508 in a D2D mode.

The radio frame structure 600 comprises radio resources spanning frequency and time. The radio resources are divided in time into subframes, with 12 subframes (labelled SF1 to SF12) represented in the figure. It will be appreciated this may simply represent an arbitrary series of subframes in a longer continuous series of subframes. Each subframe comprises some radio transmission resources comprising a scheduling allocation region 601 and some radio transmission resources comprising a data communication region 602. In this particular example the scheduling allocation region 601 is schematically represented as occurring at the beginning of each subframe and spanning all frequencies with the data communication region 602 following the scheduling allocation region 601 and again spanning all frequencies. However, it will be appreciated the exact nature of the radio frame structure and the manner in which the different regions comprising the radio frame structure, are arranged is not significant to the principles underlying certain embodiments of the present disclosure.

The scheduling allocation regions 601 are used by a transmitting terminal device, such as the first terminal device 506 represented in FIG. 5, to indicate transmission resources that are to be used for transmitting data to another terminal device, such as the second terminal device 508 represented in FIG. 5. The data communication regions 602 are used by the transmitting terminal device to transmit the user-plane data in accordance with the scheduling allocations. In this respect, from the point of view of the transmitting terminal device, the scheduling allocation regions 601 may be considered to have some functional similarity to PDCCH regions in a conventional LTE downlink subframe and the data communication regions 602 may be considered to have some functional similarity to PDSCH regions in a conventional LTE downlink subframe. However, instead of signalling being exchanged between a base station and a receiving terminal device, it is exchanged between a transmitting terminal device and a receiving terminal device. The exact manner in which scheduling allocation signalling and data transmission signalling are configured for a given D2D communications implementation is not significant to the principles underlying certain embodiments of the present disclosure. That is to say, the specific nature of the scheduling allocation signalling, and the manner in which the scheduling allocation signalling indicates corresponding resources for data communication, may be in accordance with any appropriate technique, such as those previously proposed for device-to-device communications.

A significant aspect of the subframe structure represented in FIG. 6A is that certain subframes are reserved for high priority communications. In this particular example every fourth subframe starting from subframe SF4 is assumed to be reserved for high priority data, as schematically indicated in FIG. 6A by the shading in the subframes labelled SF4, SF8 and SF12. A terminal device wishing to transmit data which is not classified as high priority is configured to avoid making transmissions in subframes which are reserved for high priority data. However, a terminal device which has high priority data to transmit may indicate this by transmitting signalling on radio resources reserved for high priority communications, i.e. resources in subframes SF4, SF8 and SF12 in the example of FIG. 6A. In this regard the time periods reserved for high priority communications may be referred to as quiet times. During quiet times the terminal devices which do not have high priority data to transmit listen to see if any terminal devices are making transmissions. Transmissions made during quiet times in effect indicate the transmissions relate to high priority data.

It will be appreciated that what constitutes high priority data may be different for different implementations. In one simple example a user of a terminal device performing device-to-device communications may simply indicate the data is high priority, for example by pressing a particular button on the terminal device. Thus, in a walkie-talkie implementation a user of the first terminal device may have a routine (non-high priority) conversation with a user of the second terminal device. The first terminal device will be configured to recognise the data corresponding to the conversation is not high priority and make transmissions at the physical layer in the subframes which are not reserved for high priority communications. However, a third user of a third terminal device may have an urgent message to transmit, and so may press a button on his terminal device to indicate his transmission is urgent (high priority), and begin talking. The third terminal device will be configured to recognise the data corresponding to the urgent message is high priority, and make transmissions in the subframes which are reserved for high priority communications. Significantly, the presence of the quiet-time subframes helps to ensure there are available resources for the third terminal device to initiate the high priority transmission without colliding with on-going transmissions from other terminal devices exchanging non-high priority data.

In accordance with some example implementations the classification of priority for data may be based on existing 3GPP priority definitions. For example, in accordance with some approaches data priority may be based on based on QCI (QoS Class Identifier), for example with data traffic classified as having a low priority relative to control signalling traffic. In accordance with some example limitations the application of priority for data may be based application based. For example, if a user uses an emergency/interruption button of a terminal device to indicate a communication should be treated as high priority, an application layer in the terminal device may be configured to recognize this and the traffic correspondingly treated as comprising high priority data. In accordance with some example implementations the classification of priority for data may be based on what are acceptable delays for the data. For example, for traffic that is categorized as delay tolerant (e.g. machine-to-machine application data), the data may be treated as having relatively low priority. However, for traffic categorized as real-time (e.g. data associated with a voice/video call), the traffic may be treated as having relatively high priority.

An example operation of device-to-device communications between the first terminal device 506 and the second terminal device 508 represented in FIG. 5 using the radio frame structure represented in FIG. 6A will now be discussed. It will be assumed the first terminal device 506 wishes to transmit data to the second terminal device on a generally ongoing basis because the communications correspond with a user of the first terminal device speaking to a user of the second terminal device with the device-to-device communications being used to support a walkie-talkie type mode of operation. It will further be assumed that data in the wireless telecommunications system in which the terminal devices are operating may be classified as either normal priority or high priority. That is to say, the data may be associated with one of two priority statuses. Data corresponding to routine communications, for example a routine conversation, may be considered as having a first priority status while urgent data, for example corresponding to a safety announcement, or control data needed to ensure continued operation of the device-to-device communications (for example because of a configuration change for the radio resources used to support D2D communications), may be considered as having a second priority status, where the second priority status indicates a higher priority than the first priority status.

Figure 7:
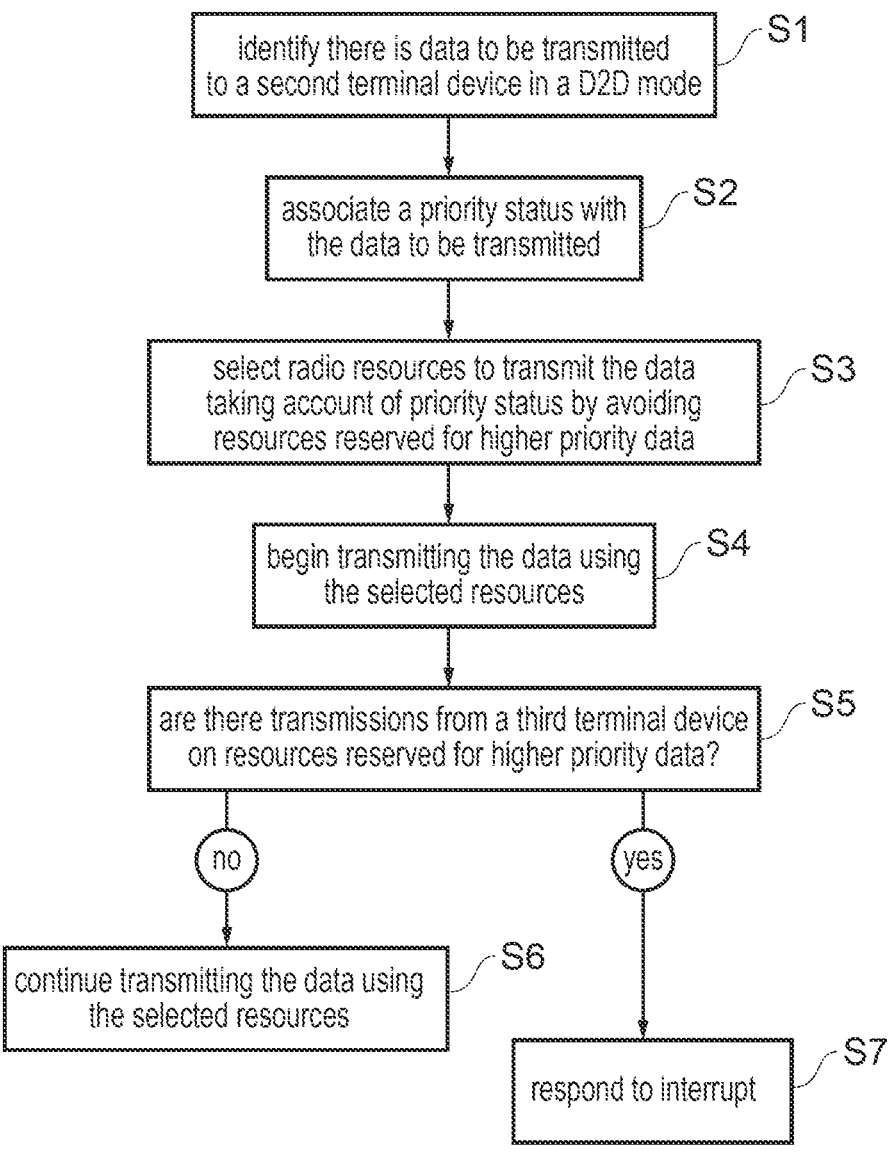
FIG. 7 is a flow diagram schematically representing a mode of operation for a first terminal device transmitting data to a second terminal device in accordance with certain embodiment of the disclosure.
Figure 8:
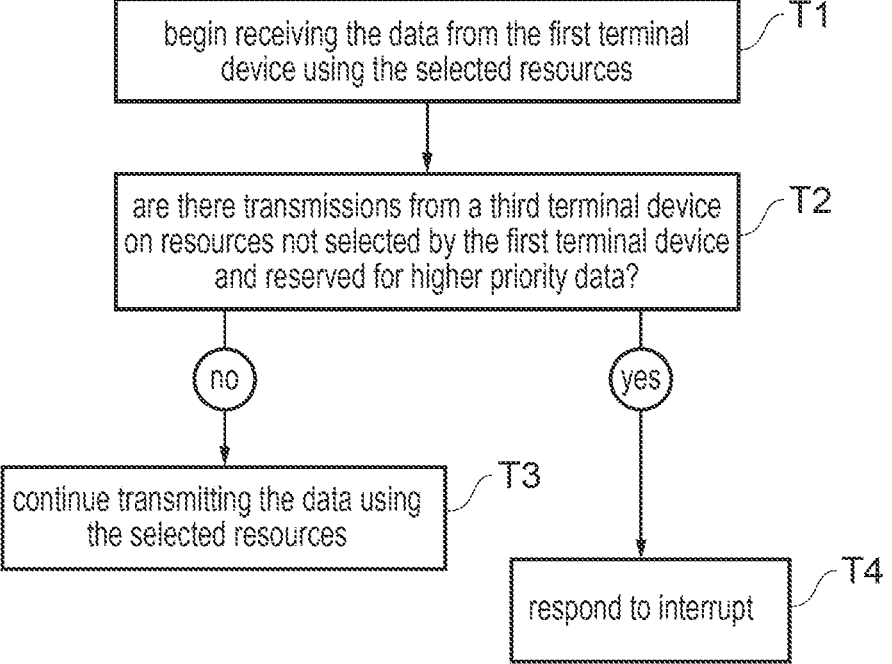
FIG. 8 is a flow diagram schematically representing a mode of operation for a second terminal device receiving data from a first terminal device in accordance with certain embodiment of the disclosure.

FIGS. 6B, 7 and 8 illustrate some aspects of how the device-to-device communications between the first terminal device and the second terminal device are implemented in accordance with some example embodiments of the disclosure. FIG. 7 is a flow diagram schematically showing some steps performed by the first (transmitting) terminal device while FIG. 8 is a flow diagram schematically showing some steps performed by the second (receiving) terminal device. FIG. 6B schematically shows radio resources of the radio frame structure of FIG. 6A selected by the first terminal device for use in making device-to-device transmissions to the second terminal device. It will be appreciated the shading in FIG. 6B is shown across all frequencies in the relevant subframes for ease of representation, but in practice the first terminal device may not use all frequencies in all the subframes selected for transmission.

Thus, in step S1 represented in FIG. 7, the first terminal device identifies there is data to be transmitted to the second terminal device in a D2D mode. This may be based, for example, on a user pressing a "transmit" button associated with the first terminal device. However, the exact nature of the data to be transmitted, and the triggering of the need to transmit the data, is not significant.

In step S2 represented in FIG. 7, the first terminal device associates a priority status with the data to be transmitted. There are various ways in which the priority status may be determined and some examples are discussed further below. In this particular example embodiment it is assumed the user of the first terminal device is able to select whether his transmission should be classified as having a first priority status (normal priority) or a second priority status (high priority) and indicate this, for example by simply pressing a particular button associated with the terminal device (e.g. an "urgent" button may be used to indicate a date of high priority). Here it is assumed the user of the first terminal device indicates his transmissions are of normal priority.

In step S3 represented in FIG. 7, the first terminal device selects radio resources to use for transmitting the data in the manner which takes account of the associated priority status. In particular, and referring to FIG. 6A, the first terminal device avoids using radio resources in the subframes SF4, SF8 and SF12 which are reserved for high priority data. In this example it is assumed the first terminal device wishes to use radio resources in all other subframes, as schematically indicated by the shading in FIG. 6B. Thus, referring to FIG. 6B, the first terminal device transmits data comprising scheduling allocation signalling in each of the scheduling allocation signalling regions 601 of subframes SF1 to SF3, SF5 to SF87, and SF9 to SF11, and makes corresponding user-plane data transmissions in the data communication regions of these subframes. As noted above, the exact manner in which the scheduling allocation signalling indicates the corresponding resources for data communications is not significant. Furthermore, it is not significant whether the scheduling allocation signalling in a particular subframe applies to only one subframe or whether it applies to multiple subframes. An general the specific configuration and operation in this regard will depend on the particular implementation at hand. Furthermore, it will be appreciated the relevant radio resources to be used need not all be selected at one time, but these resources may be selected on an ongoing basis according to ongoing data transmission requirements.

In step S4 represented in FIG. 7, the first terminal device transmits data to the second terminal device using the selected resources. This may be done in accordance with any established device-to-device communications techniques.

In step T1 represented in FIG. 8, the second terminal device begins receiving the data that is being transmitted by the first terminal device in step S5 of FIG. 7 using the selected radio resources. Again this may be done in accordance with any established device-to-device communications techniques.

Thus, referring to the example selection of radio resources for transmission by the first terminal device represented in FIG. 6B, the first terminal device begins by transmitting scheduling allocation data and user-plane data in subframes SF1, SF2 and SF3, and the second terminal device correspondingly receives these transmissions.

In subframe SF4 (which is reserved for high priority data) the first terminal device does not make transmissions, and instead seeks to decode any transmissions from any other terminal devices being made using these radio resources, as schematically represented by step S5 in FIG. 7. Similarly, in subframe SF4 the second terminal device also listens to see if there are any other terminal devices making transmissions on these radio resources, as schematically represented by step T2 in FIG. 8.

In effect, subframe SF4 may be considered to represent a quiet time during which terminal devices not having urgent data for transmission do not transmit. Thus, a third terminal device which does have urgent data to transmit (or indeed the first or second terminal devices if they identify they have urgent data to transmit) may wait until this reserved subframe to make transmissions. In effect, the provision of the quiet time in subframe SF4 provides an opportunity for terminal devices with urgent data to transmit to interrupt communications from other terminal devices.

If there are no terminal devices with urgent data to transmit the first and second terminal devices will not receive any such transmissions in subframe SF4. Thus, in this case the first and second terminal devices determine in their respective steps S5 in FIG. 7 and T2 in FIG. 8 that there is no other terminal device transmitting in the restricted subframe SF4, and processing for the first terminal device follows the "no" branch from step S5 to step S6 and processing for the second terminal device follows the "no" branch from step T2 to step T3. The device-to-device communications between the first and second terminal devices may then continue in the next subframes that are not reserved for high priority data, for example subframes SF5, SF6 and SF7, until the next "quiet time" is reached in subframe SF8. In subframe SF8 the first and second terminal devices in effect behave in the same manner as in subframe SF4. Thus, assuming there are no other terminal devices with urgent data to transmit, the device-to-device communications between the first terminal device and second terminal device can continue using the selected radio resources.

However, if there is a terminal device with urgent data to transmit, for example if there is a third terminal device for which a user has indicated he has an urgent transmission to make, that terminal device may wait until the next quiet time, for example in SF4, SF8 or SF12, to make transmissions relating to the urgent data (e.g. transmission of the data itself, or an indication that the first terminal device has urgent data to transmit and so other terminal devices should not make transmissions for a period of time following the quiet time. The transmissions relating to high priority data during the quiet time (i.e. on the reserved resources) may, for example, have a format corresponding to a conventional scheduling allocation message and be sent in the scheduling allocation region 601 of the relevant subframe, with corresponding user-plane data, for example comprising the content of the urgent transmission, transmitted in the communication data region 602 of the relevant subframe and/or subsequent subframes.

Thus, if in the respective steps S5 in FIG. 7 and T2 in FIG. 8 the first and second terminal devices receive signalling from a third terminal device indicating the third terminal device has urgent (high priority) data to transmit, processing for the first terminal device follows the "yes" branch from step S5 to step S7 and processing for the second terminal device follows the "yes" branch from step T2 to step T4 in which the respective terminal devices respond/react to the interrupt. The exact manner in which the first and second terminal device respond to the interrupt will depend on the implementation at hand.

For example, in some cases the first terminal device may be configured to cancel any subsequently scheduled data transmissions after receiving an indication that a third terminal device has urgent data to transmit (e.g., cancelling the transmissions scheduled in subframes SF5, SF6 and so on in response to receiving a transmission in subframe SF4). This in effect frees up the available transmission resources for use by the third terminal device. The first terminal device may, for example, avoid making any further transmissions until it is indicated the urgent data transmission from the third terminal device is completed. This indication may come, for example, in association with information transmitted by the third terminal device, for example explicit signalling to indicate the urgent transmission is complete, or may come from the first terminal device determining there are no transmissions in a subsequent subframe reserved for high priority data, for example subframe SF8. Once the first terminal device identifies it can re-start transmissions it may recover from the interrupted state, and proceed with making transmissions in accordance with whichever recovery protocols apply for the application hand.

The urgent transmission from the third terminal device may or may not be directed to the first terminal device, and the first terminal device may correspondingly receive or not receive subsequent transmissions from the third terminal device associated with the urgent data to be transmitted.

The second terminal device may respond to the interruption by stopping reception of transmissions from the first terminal device, and instead seeking to receive further transmissions from the third terminal device.

In some cases the data communication region 602 in a quiet-time subframe used by a terminal device for urgent data may be sufficient to communicate the urgent data, in which case the communications between the first and second terminal device might simply continue as normal in the other subsequent subframes.

Thus approaches in accordance with the principles described above introduce what is in effect an interrupt mechanism for D2D communications whereby a terminal device having data associated with a relatively high priority is provided with an opportunity to transmit this data by making use of radio resources which are not selected for use by other terminal devices for transmitting lower priority data. In broad summary this is achieved by terminal devices associating a priority status with data to be transmitted in a D2D manner and selecting radio resources on which to transmit the data in a manner that takes account of the data's priority status, thereby leaving resources that are not selectable for transmitting low priority data available for terminal devices having high priority data to transmit.

A terminal device receiving low priority data from a transmitting terminal device in a device-to-device manner may be configured to determine if another terminal device is transmitting data on a radio resource which is not selected for transmitting data by the first terminal device and which is reserved for transmitting data classified as having a high priority; and, if so, may stop reception of data from the first terminal device on the selected radio resources and instead seek to receive further transmissions from the other terminal device.

A terminal device having urgent data to transmit may do so by selecting the resources reserved for high priority data for transmitting either the urgent data itself, or for transmitting an indication that other terminal devices should restrict their transmissions in some way (e.g. for a particular number of subframes) to allow the terminal device having the urgent data to transmit to do so.

It will be appreciated there may be modifications to the above-described approach in accordance with different specific implementations. For example, in an implementation in which allocation signalling in one subframe may relate to radio resources in a data communication region of another subframe, the radio resources restricted for high priority data might only comprise scheduling allocation region radio resources in certain subframes. For example, in a variation of the approach presented in FIGS. 6A and 6B, the respective data communication regions 601 of the subframes comprising radio resources which are reserved for high priority data may be available for use for communicating low priority data, but with the scheduling allocation regions in the relevant subframe remaining reserved. Thus, a scheduling allocation message transmitted by the first terminal device in subframe SF1, SF2 or SF3, for example, may be used to allocate resources in the data communication region 602 of subframe SF4 for communicating low priority data. However, the scheduling allocation region 601 of subframe SF4 remains reserved for use in association with high priority data. In such a case, if the first terminal device identifies a third terminal device has transmitted a scheduling allocation message using a scheduling allocation region reserved for use in association with high priority data (e.g. in subframe SF4), the first terminal device may cancel its scheduled transmission in the data communication region 602 of the relevant subframe, thereby allowing the terminal device having urgent data to transmit to use these resources. This approach reduces the amount of radio resources which could otherwise be unused because they are reserved for high priority data when there is no high priority transmissions to be made.

The examples described above have focused on an implementation having two-levels of priority status, that is to say data is either classified as non-urgent (and so transmission of the data is avoided on certain resources) or urgent (and so may be transmitted on resources to be avoided for other data). In some other implementations in accordance with embodiments of the disclosure a greater number of different priority levels may be provided to provide for a more general data prioritisation scheme using similar principles. In effect this may be provided by applying different restrictions on what radio resources may be used for transmitting data having different priority status levels.

Figure 9:
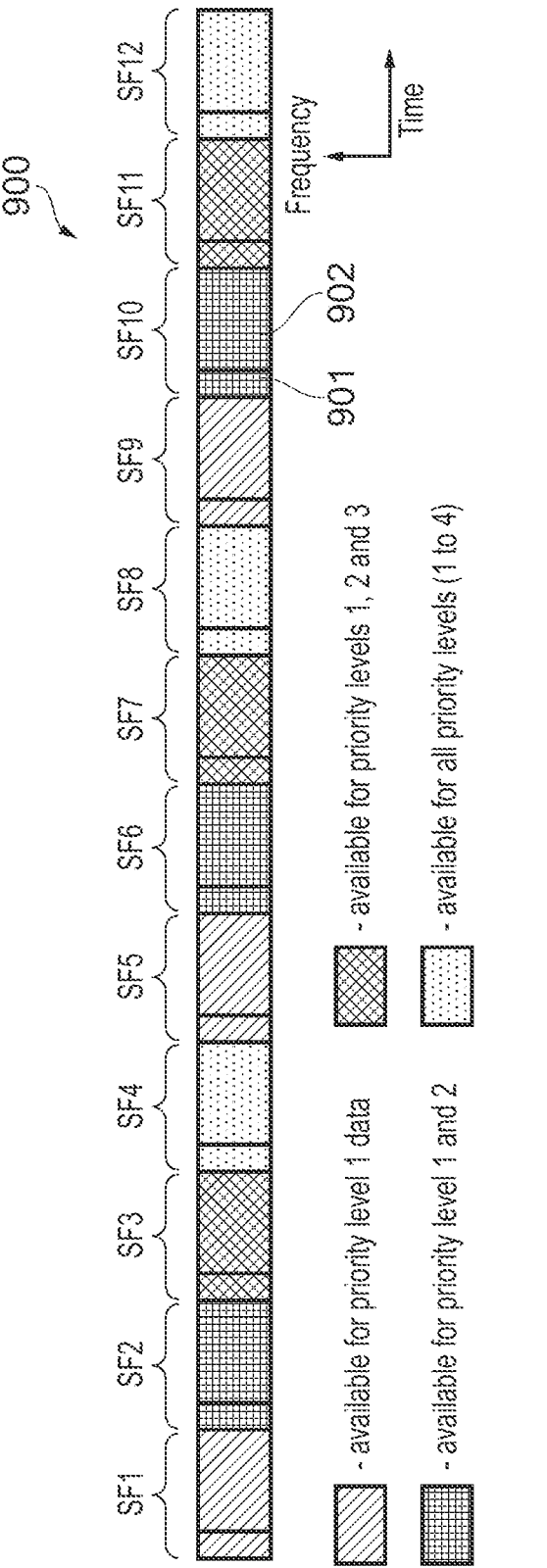
FIG. 9 schematically shows a radio frame structure for supporting device-to-device communications between terminal devices in accordance with certain embodiments of the disclosure.

FIG. 9 schematically shows a radio frame structure 900 supporting prioritisation for device-to-device communications between terminal devices in accordance with an embodiment of the disclosure.

As with the radio frame structure 600 represented in FIGS. 6A and 6B, the radio frame structure 900 comprises radio resources spanning frequency and time. The radio resources are divided in time into subframes, with 12 subframes (labelled SF1 to SF12) represented in the figure.

Each subframe comprises some radio transmission resources comprising a scheduling allocation region 901 and some radio transmission resources comprising a data communication region 902. In this particular example the scheduling allocation region 901 is schematically represented as occurring at the beginning of each subframe and spanning all frequencies, while the data communication region 902 follows the scheduling allocation region 901, again spanning all frequencies. However, it will be appreciated the exact nature of the radio frame structure and the manner in which the different regions comprising the radio frame structure, are arranged is not significant to the principles underlying certain embodiments of the present disclosure.

The functionality associated with the scheduling allocation regions 901 and the data communication regions 902 for supporting D2D communications may be generally in accordance with the principles described above for the scheduling allocation regions 601 and the data communication regions 602 represented in FIGS. 6A and 6B, but with different restrictions on which radio resources can be used for transmitting which priorities of data. The exact manner in which scheduling allocation signalling and data transmission signalling are configured in a given D2D communications implementation is not significant to the principles underlying certain embodiment of the present disclosure. That is to say, the specific nature of the scheduling allocation signalling, and the manner in which the scheduling allocation signalling indicates corresponding resources for data communication, may be in accordance with any appropriate technique, such as those previously proposed for device-to-device communications.

For the example represented in FIG. 9 it is assumed the wireless telecommunications system for which the radio frame structure 900 applies supports four different levels of data priority. These may be referred to as priority level 1, priority level 2, priority level 3 and priority level 4. Priority level 1 is for data having the highest priority, priority level 2 is for data having the second highest priority, priority level 3 is for data having the third highest priority and priority level 4 is for data having the lowest priority.

A significant aspect of the subframe structure represented in FIG. 9 is that certain subframes are reserved for certain priority communications. In this particular example every fourth subframe starting from SF1 is assumed to be reserved for priority level 1 data, as schematically indicated in FIG. 9 by the diagonal hatching in the subframes labelled SF1, SF5 and SF9. Every fourth subframe starting from SF2 is assumed to be reserved for priority level 1 and 2 data, as schematically indicated in FIG. 9 by the square hatching in the subframes labelled SF2, SF6 and SF10. Every fourth subframe starting from SF3 is assumed to be reserved for priority level 1, 2 and 3 data, as schematically indicated in FIG. 9 by the crossed-diagonal hatching in the subframes labelled SF3, SF7 and SF11. Finally, every fourth subframe starting from SF4 is assumed to be available for all protein levels, as schematically indicated in FIG. 9 by the dot hatching in the subframes labelled SF4, SF8 and SF12.

A terminal device wishing to transmit data in a wireless telecommunications system implementing the radio frame structure of FIG. 9 associates a priority status with the data to be transmitted (i.e. priority level 1, 2, 3 or 4). It will be appreciated the particular reasons why particular data are associated with particulate priorities are not significant to the principles underlying embodiments of the present disclosure and may depend on the specific implementation at hand. The terminal device then selects resources to seek to use for transmitting the data by taking account of the associated priority level. For example, if the data are classified as priority level 1, the terminal device may seek to use resources in all subframes. However, if the data are classified as priority level 2, the terminal device may seek to use resources in all subframes except for the subframes reserved for priority level 1 (SF1, SF5, SF9). If the data are classified as priority level 3, the terminal device may seek to use resources in only half the subframes, namely those available for all priority levels and those reserved for priority levels 1, 2 and 3 (SF3, SF4, SF7, SF8, SF11, SF12). If the data are classified as priority level 4, the terminal device will avoid using resources in all subframes except for those available for all priority levels (SF4, SF8, SF12).

Thus, there are more radio resources available for transmitting higher priority data than for transmitting lower priority data. This provides a natural mechanism for prioritising the likelihood of successful transmission of data according to its associated priority level. Furthermore, a terminal device that has started transmitting high priority data in a particular subframe reserved for data with that priority may preferentially obtain access to radio resources in subsequent subframes, even though these resources may be available to all priority levels, by virtue of having already begun transmitting.

A potential drawbacks with the approach represented in FIG. 9 is that low priority data may become "stuck" if the resources are continually being used by higher priority data. To address this a terminal device may be configured to in effect upgrade the priority level for its data if one or more criteria are met, for example if the data cannot be sent within a predefined period of time. For example, a terminal device having low priority data for transmission may be configured to start a timer when the data is first queued for transmission, and if the terminal device fails to transmit the data, or to transmit the data completely, within a certain time frame, it may increase the priority level of the data, for example by one level, to gain access to a wider range of radio resources. The priority level could be retained as a terminal device internal variable, or as a variable set in response to receiving signalling from another entity. The terminal device may they continue trying to transmit the data on resources associated with the updated priority level. Again, if the data cannot be transmitted within a certain time (and/or other relevant criteria are met), the priority level may be increased further still, and so on until the data is successfully transmitted. Various parameters may be used to control when a terminal device should update the priority status of data waiting for transmission. For example, the decision to update the priority level may be based on the time for which the data has remained pending, the size of the data to be transmitted, and potentially also the number of other terminal devices contending for the available transmission resources. The relevant parameters may be specification defined, or may be controlled from a coordinating entity, such as a base station.

The upgrade condition/criteria may be based on a single parameter or a combination of parameters, such as a single composite value determined from a plurality of parameters. For example, the criteria may be based on a value calculated from a combination of some or all of a buffer size, a waiting time and traffic priority. Each parameter may have a weighting factor. The weighting factors could, for example, be variable and configured by higher layers.

As well as providing schemes for interruption and prioritisation, similar principles may be used for managing the transfer of delay-tolerant data. For example, in one implementation a terminal device may wish to transmit a relatively large volume of delay-tolerant data. In this respect, the fact the data is delay tolerant may be considered as classifying the data as low priority as compared to normal priority data. The terminal device may issue a scheduling allocation message to indicate resources to be used in data communication regions of a plurality of subsequent subframes for transmitting the delay-tolerant data. The data may then be transmitted in the data communication regions of the subsequent subframes without requiring corresponding scheduling allocation signalling in those subframes (i.e. a scheduling allocation message in one subframe may apply for a plurality of subframes). The terminal device may then proceed with transmitting the data in selected resources corresponding to the data communication regions of the subsequent subframes while avoiding transmissions in the scheduling allocation regions of the subsequent subframes. In this respect the scheduling allocation regions of the subsequent subframes may be considered as being reserved for use by higher priority data (i.e. data which is not delay tolerant). If the terminal device recognises another terminal device issues a scheduling allocation message in one of the subframes, the terminal device may stop transmitting the delay-tolerant data in subsequent data communication regions, thereby releasing these radio resources for use by the high priority (non-delay-tolerant) data.

While the above-described examples have focused on implementations in which the radio resources reserved for different priorities of data are separated in the time domain, in accordance with other embodiments the radio resources may instead, or in addition, be reserved in the frequency domain. For example, instead of reserving certain subframes for various levels of priority, certain frequency resources in all, or some, subframes, may be reserved for this purpose instead. In yet other examples, the radio resources reserved for urgent communications may comprise scheduling allocation messages having particular characteristics, for example in terms of preambles, or time and frequency of transmission.

The actual radio resources which are reserved for different levels of priority may be determined in various ways. For example, the specific resources to be reserved for the different levels of priority may be defined in accordance with an operating standard for the wireless telecommunications system in which the terminal devices operate, or may be communicated from a coordinating entity of the wireless telecommunications system, for example a base station. In other examples the radio resources reserved to allow terminal devices with high priority data to transmit may not be predefined, but may depend on ongoing traffic conditions. For example, there may simply be a requirement that any individual terminal device should not transmit continuously for longer than a threshold duration, and instead should avoid making transmissions in subframes according to a predefined cycle, for example after a given number of subframes of continuous transmission the terminal device should not make any transmissions for one (or more) subframes to allow other terminal devices with more urgent data to initiate transmissions, for example by setting their own scheduling allocation signalling. The fraction of resources reserved for different levels of priority may be selected according to the expected levels of traffic at the different priority levels.

Furthermore, while the example embodiments represented in FIGS. 6A, 6B and 9 have focused on embodiments in which the radio resources supporting the D2D communications are arranged in a continuous manner in both time and frequency, it will be appreciated in other embodiments the radio resources supporting the D2D communications might not be continuous in time and/or frequency. For example, rather than have a continuous series of subframes supporting D2D communications, in another implementation there may be gaps between the subframes. For example, the radio resources supporting the D2D communications link may, for example, comprise two 10 ms subframes in every 40 ms period. More generally, the radio resources supporting the D2D communication link may be scattered in terms of time and frequency, for example to use particular resources within a frame structure associated with a wireless telecommunications system in which the D2D communications are being made. Thus, the specific arrangement of radio resources comprising the D2D communications link in any given implementations may be different according to, for example, the manner in which the D2D communications are permitted to access radio resources used for other purposes, for example for conventional communications between a base station and terminal devices in a communication cell of a wireless telecommunications system in which the D2D terminal devices are operating. That is to say, the D2D radio frame structure might not mirror a conventional LTE radio frame structure. The D2D frame structure might, however, have some basis in a conventional LTE frame structure. For example, the D2D frame structure might be based on radio resources comprising a defined subset of frequency resources and/or subframes of a conventional LTE frame structure.

As noted above, there are various ways in which the terminal devices can determine a priority status for the data they are to transmit. For example, the priority status may be based on one or more of (i) a logical channel for the data, for example with data for certain logical channel is being classified as having a certain priority; (ii) a desired quality of service for the data; (iii) an indication of priority for the data received from a user of the first terminal device; (iv) an application within the first terminal device with which the data is associated; (v) the nature of any connection between the first terminal device and a core network of a wireless telecommunications system in which the first terminal device is operating (e.g. whether in idle or connected mode); (vi) a classification type for the terminal device (for example, a terminal device associated with law enforcement or rescue services may be considered to always generate high priority data), (vii) a classification type for an application associated with the data; and (viii) a classification type for a service associated with the data.

Although the above-described examples have focused on implementations in the context of an LTE-based wireless telecommunications system, it will be appreciated similar principles can be adopted for in wireless telecommunications systems operating in accordance with other protocols. In some example implementations the wireless telecommunications system might comprise terminal devices which are configured to communicate with one another in a device-to-device manner without there being any infrastructure equipment (e.g. a base station) to also provide for communications through the infrastructure equipment. In some respects such an approach corresponds with an implementation in which the terminal devices may in fact be considered to be always out of coverage.

Thus a method of operating a first terminal device to transmit data to a second terminal device by performing device-to-device communication is disclosed. The method comprises selecting radio resources, e.g. particular subframes (or other defined time blocks) or frequencies, on which to transmit the data to the second terminal device based on a priority status associated with the data, whereby certain radio resource are reserved for use in association with data classified as high priority. There is also disclosed a method of operating the second terminal device to receive data from the first terminal device. The method comprises receiving data from the first terminal device using the selected radio resources; determining if another terminal device is transmitting data on a radio resource which is not selected for transmitting data by the first terminal device and which is reserved for transmitting data classified as having a high priority; and, if so, stopping reception of data from the first terminal device on the selected radio resources and instead seeking to receive further transmissions from the other terminal device. The disclosed methods thus provide a mechanism whereby a terminal device with high priority data to transmit is provided with an opportunity to interrupt on-going communications between the first and second terminal devices.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a first terminal device to transmit data to a second terminal device by performing device-to-device communication, wherein the method comprises:

selecting radio resources on which to transmit the data to the second terminal device based on a priority status associated with the data; and transmitting the data to the second terminal device using the selected radio resources.

Paragraph 2. The method of paragraph 1, wherein the device-to-device communication is performed over a radio interface comprising radio resources divided into a plurality of time blocks and selecting radio resources on which to transmit the data to the second terminal device comprises selecting one or more time blocks in which to transmit the data to the second terminal device, and/or, wherein the device-to-device communication is performed over a radio interface comprising radio resources divided into a plurality of frequencies and selecting radio resources on which to transmit the data to the second terminal device comprises selecting one or more frequencies on which to transmit the data to the second terminal device Paragraph 3. The method of paragraph 1 or 2, wherein the radio resources on which to transmit the data are selected from a set of radio resources which excludes a predefined subset of radio resources if the data is associated with a first priority status and are selected from a set of radio resources which does not exclude the predefined subset of radio resources if the data is associated with a second priority status, wherein the first priority status indicates the data has a lower priority than data associated with the second priority status.

Paragraph 4. The method of paragraph 3, wherein the predefined set of radio resources comprises a temporally repeating pattern of radio resources in which transmissions of the data associated with the first priority status are to be avoided.

Paragraph 5. The method of paragraph 3 or 4, wherein the predefined set of radio resources is established in dependence on an operating standard for the first terminal device and/or in dependence on signalling received from a network entity of a wireless telecommunications system in which the first terminal device is operating.

Paragraph 6. The method of paragraph 3, 4 or 5, wherein the radio resources on which to transmit the data are selected from a set of radio resources which excludes both the predefined subset of radio resources and a further predefined subset of radio resources if the data is associated with a further priority status and are selected from a set of radio resources which does not exclude the further predefined set of radio resources if the data is associated with the first priority status or the second priority status, wherein the further priority status indicates the data has a lower priority than data associated with the first priority status and the second priority status.

Paragraph 7. The method of any of paragraphs 1 to 6, further comprising the first terminal device determining if another terminal device is transmitting data using a radio resource which is not selected by the first terminal device for transmitting the data device based on its priority status.

Paragraph 8. The method of paragraph 7, further comprising the first terminal device cancelling transmissions of the data on one or more of the selected radio resources following a determination that another terminal device is transmitting data on a radio resource which is not selected by the first terminal device for transmitting the data device based on its priority status.

Paragraph 9. The method of paragraph 8, further comprising the first terminal device seeking to receive further transmissions from the terminal device transmitting data in a radio resource which is not selected for transmitting data by the first terminal device on radio resources in which the first terminal device has cancelled its own transmissions.

Paragraph 10. The method of any of paragraphs 1 to 9, wherein the priority status associated with data is determined based on one or more of:

(i) a logical channel for the data;

(ii) a quality of service requirement for the data;

(iii) an indication of priority for the data received from a user of the first terminal device;

(iv) an application within the first terminal device with which the data is associated;

(v) the nature of any connection between the first terminal device and a core network of a wireless telecommunications system in which the first terminal device is operating;

(vi) a classification type for the terminal device;

(vii) a classification type for an application associated with the data;

(viii) a classification type for a service associated with the data.

Paragraph 11. The method of any of paragraphs 1 to 10, further comprising the first terminal device associating the data with an updated priority status and selecting one or more radio resources on which to transmit the data to the second terminal device based on the updated priority status if it is determined it would take longer than a predefined threshold duration to transmit the data to the second terminal device on radio resources selected based on the data's priority status prior to being updated.

Paragraph 12. The method of any of paragraphs 1 to 11, wherein a transmission characteristic for data transmitted by the first terminal device is selected in dependence on the priority status for the data.

Paragraph 13. The method of paragraph 12, wherein the transmission characteristic comprises a transmission power.

Paragraph 14. The method of any of paragraphs 1 to 13, wherein the method is performed in a wireless telecommunications system comprising the first and second terminal devices and a base station, and wherein the method further comprises the first terminal device exchanging further data with the base station.

Paragraph 15 The method of any of paragraphs 1 to 14, wherein the data to be transmitted by the first terminal device comprises user-plane data and/or control data indicating radio resources the first terminal device intends to use to transmit other data.

Paragraph 16. A terminal device configured to transmit data to a second terminal device by performing device-to-device communication, wherein the terminal device comprises a controller unit and a transceiver unit configured to operate together to select radio resources on which to transmit the data to the second terminal device based on a priority status associated with the data; and to transmit the data to the second terminal device using the selected radio resources.

Paragraph 17. Circuitry for a terminal device configured to transmit data to a second terminal device by performing device-to-device communication, wherein the circuitry comprises a controller element and a transceiver element configured to operate together to cause the terminal device to select radio resources on which to transmit the data to the second terminal device based on a priority status associated with the data; and to transmit the data to the second terminal device using the selected radio resources.

Paragraph 18. A method of operating a second terminal device to receive data from a first terminal device by performing device-to-device communication, wherein the method comprises:

receiving data from the first terminal device using radio resources selected by the first terminal device for transmitting the data;

determining if another terminal device is transmitting data on a radio resource which is not selected for transmitting data by the first terminal device and which is reserved for transmitting data classified as having a high priority; and, if so, stopping reception of data from the first terminal device on the selected radio resources and instead seeking to receive further transmissions from the other terminal device.

Paragraph 19. A terminal device configured to receive data from a transmitting terminal device by performing device-to-device communication, wherein the terminal device comprises a controller unit and a transceiver unit configured to operate together to: receive data from the transmitting terminal device using radio resources selected by the first terminal device for transmitting the data; determine if another terminal device is transmitting data on a radio resource which is not selected for transmitting data by the transmitting terminal device and which is reserved for transmitting data classified as having a high priority; and, if so, to stop reception of data from the transmitting terminal device on the selected radio resources and instead seek to receive further transmissions from the other terminal device.

Paragraph 20. Circuitry for a terminal device configured to receive data from a transmitting terminal device by performing device-to-device communication, wherein the circuitry comprises a controller element and a transceiver element configured to operate together to cause the terminal device to: receive data from the transmitting terminal device using radio resources selected by the first terminal device for transmitting the data; determine if another terminal device is transmitting data on a radio resource which is not selected for transmitting data by the transmitting terminal device and which is reserved for transmitting data classified as having a high priority; and, if so, to stop reception of data from the transmitting terminal device on the selected radio resources and instead seek to receive further transmissions from the other terminal device.

REFERENCES

[1] US 2013/0012221
[2] US 2012/0265818
[3] LTE for UMTS: OFDMA and SC-FDMA Based Radio Access, Harris Holma and Antti Toskala, Wiley 2009, ISBN 978-0-470-99401-6.
[4] R2-133840, "CSMA/CA based resource selection," Samsung, published at 3GPP TSG-RAN WG2 #84, San Francisco, USA, 11-15 Nov. 2013.
[5] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.
[6] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.
[7] R2-134426, "Medium Access for D2D communication", LG Electronics Inc, published at 3GPP TSG-RAN WG2 #84, San Francisco, USA, 11-15 Nov. 2013.
[8] R2-134238, "D2D Scheduling Procedure", Ericsson, published at 3GPP TSG-RAN WG2 #84, San Francisco, USA, 11-15 Nov. 2013.
[9] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.
[10] R2-134431, "Simulation results for D2D voice services using connectionless approach", General Dynamics Broadband UK, published at 3GPP TSG-RAN WG2 #84, San Francisco, USA, 11-15 Nov. 2013.
[11] "D2D Resource Allocation under the Control of BS", Xiagong R. et al, University of Electronic Science and Technology of China, https://mentor.ieee.org/802.16/dcn/13/16-13-0123-02-000n-d2d-resource-allocation-under-the-control-of-bs.docx
[12] US20130170387
[13] US20120300662

What is claimed is:

1. A method of operating a first terminal device to transmit data to a second terminal device by performing device-to-device (D2D) communication, the method comprising:
selecting radio resources on which to transmit the data to the second terminal device based on a priority status associated with the data; and
transmitting the data to the second terminal device using the selected radio resources, wherein the radio resources on which to transmit the data are selected from a first set of radio resources if the data is associated with a first priority status and are selected from a second set of radio resources which includes the first set of radio resources and radio resources not included in the first set of radio resources if the data is associated with a second priority status.

2. The method of claim 1, wherein
the D2D communication is performed over a radio interface comprising radio resources divided into a plurality of time blocks and selecting radio resources on which to transmit the data to the second terminal device comprises selecting one or more time blocks in which to transmit the data to the second terminal device.

3. The method of claim 1, wherein
the D2D communication is performed over a radio interface comprising radio resources divided into a plurality of frequencies and selecting radio resources on which to transmit the data to the second terminal device comprises selecting one or more frequencies on which to transmit the data to the second terminal device.

4. The method of claim 1, wherein
the radio resources on which to transmit the data are selected from a set of radio resources which excludes a predefined subset of radio resources if the data is associated with a first priority status and are selected from a set of radio resources which does not exclude the predefined subset of radio resources if the data is associated with a second priority status.

5. The method of claim 4, wherein
the first priority status indicates the data has a lower priority than data associated with the second priority status.

6. The method of claim 4, wherein
the predefined set of radio resources comprises a temporally repeating pattern of radio resources in which transmissions of the data associated with the first priority status are to be avoided.

7. The method of claim 4, wherein
the predefined set of radio resources is established based on an operating standard for the first terminal device and/or based on signaling received from a network entity of a wireless telecommunications system in which the first terminal device is operating.

8. The method of claim 4, wherein
the radio resources on which to transmit the data are selected from a set of radio resources which excludes both the predefined subset of radio resources and a further predefined subset of radio resources if the data is associated with a further priority status and are selected from a set of radio resources which does not exclude the further predefined set of radio resources if the data is associated with the first priority status or the second priority status, wherein the further priority status indicates the data has a lower priority than data associated with the first priority status and the second priority status.

9. The method of claim 1, wherein
the first priority status indicates the data has a lower priority than data associated with the second priority status.

10. The method of claim 1, further comprising:
determining if another terminal device is transmitting data using a radio resource which is not selected by the first terminal device for transmitting the data based on its priority status.

11. The method of claim 10, further comprising:

canceling transmissions of the data on one or more of the selected radio resources following a determination that another terminal device is transmitting data on a radio resource which is not selected by the first terminal device for transmitting the data based on its priority status.

12. The method of claim 11, further comprising:

receiving further transmissions from the another terminal device transmitting data in a radio resource which is not selected for transmitting data by the first terminal device on radio resources in which the first terminal device has cancelled its own transmissions.

13. The method of claim 1, wherein the priority status associated with data is determined based on one or more of:

(i) a logical channel for the data;

(ii) a quality of service requirement for the data;

(iii) an indication of priority for the data received from a user of the first terminal device;

(iv) an application within the first terminal device with which the data is associated;

(v) the nature of any connection between the first terminal device and a core network of a wireless telecommunications system in which the first terminal device is operating;

(vi) a classification type for the terminal device;

(vii) a classification type for an application associated with the data; and (viii) a classification type for a service associated with the data.

14. The method of claim 1, further comprising:

associating the data with an updated priority status; and selecting one or more radio resources on which to transmit the data to the second terminal device based on the updated priority status if it is determined it would take longer than a predefined threshold duration to transmit the data to the second terminal device on radio resources selected based on the data's priority status prior to being updated.

15. The method of claim 1, wherein a transmission characteristic for data transmitted by the first terminal device is selected based on the priority status for the data.

16. The method of claim 15, wherein the transmission characteristic comprises a transmission power.

17. The method of claim 1, wherein the data to be transmitted by the first terminal device comprises user-plane data and/or control data indicating radio resources the first terminal device intends to use to transmit other data.

18. A terminal device configured to transmit data to a second terminal device by performing device-to-device communication, the terminal device comprising:

circuitry configured to select radio resources on which to transmit the data to the second terminal device based on a priority status associated with the data; and transmit the data to the second terminal device using the selected radio resources, wherein the radio resources on which to transmit the data are selected from a first set of radio resources if the data is associated with a first priority status and are selected from a second set of radio resources which includes the first set of radio resources and radio resources not included in the first set of radio resources if the data is associated with a second priority status.

19. A terminal device configured to transmit data to a second terminal device by performing device-to-device communication, the terminal device comprising:

circuitry configured to associate the data with an updated priority status;

select one or more radio resources on which to transmit the data to the second terminal device based on the updated priority status if it is determined it would take longer than a predefined threshold duration to transmit the data to the second terminal device on radio resources selected based on the data's priority status prior to being updated; and transmit the data to the second terminal device using the selected radio resources.

* * * * *